C. A. PARSONS, A. Q. CARNEGIE & S. S. COOK.
GEAR CUTTING MACHINE.
APPLICATION FILED DEC. 13, 1913.

1,192,450.   Patented July 25, 1916.

Witnesses:
Inventors:
Charles A. Parsons,
Alfred Q. Carnegie, &
Stanley S. Cook,
by their Attorneys.

UNITED STATES PATENT OFFICE.

CHARLES A. PARSONS AND ALFRED QUINTIN CARNEGIE, OF NEWCASTLE-UPON-TYNE, AND STANLEY SMITH COOK, OF WALLSEND, ENGLAND; SAID CARNEGIE AND COOK ASSIGNORS TO SAID PARSONS.

GEAR-CUTTING MACHINE.

1,192,450.   Specification of Letters Patent.   Patented July 25, 1916.

Original application filed March 25, 1913, Serial No. 756,762. Divided and this application filed December 13, 1913. Serial No. 806,567.

*To all whom it may concern:*

Be it known that we, CHARLES ALGERNON PARSONS, K. C. B., and ALFRED QUINTIN CARNEGIE, of Heaton Works, Newcastle-upon-Tyne, Northumberland, England, and STANLEY SMITH COOK, of Turbinia Works, Wallsend, Northumberland, England, subjects of the King of Great Britain and Ireland, have invented certain new and useful Improvements in Gear-Cutting Machines, of which the following is the specification.

This invention relates to methods and means for cutting the teeth in gear wheels, such as is described in our application, Serial No. 756,762 filed March 25, 1913.

Figure 1:
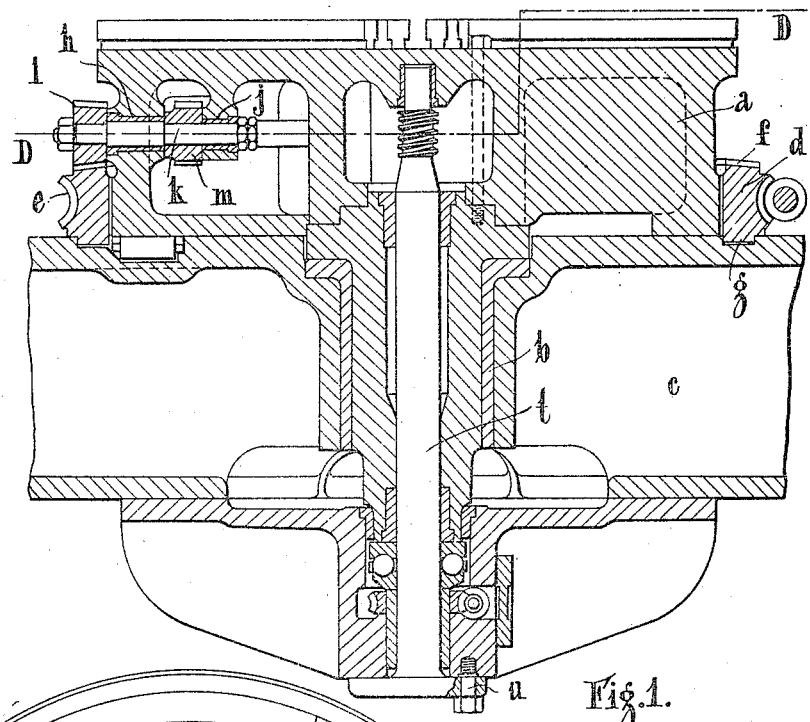
Figure 2:
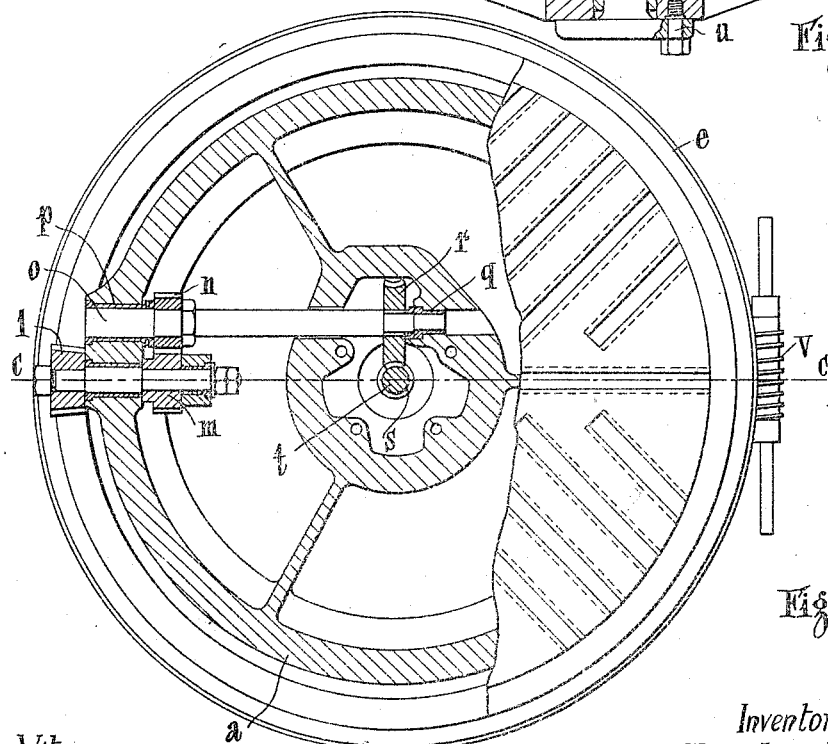

Referring to the accompanying drawings, Figure 1 is a cross sectional elevation through the work carrying table of a gear cutting machine embodying the present invention; Fig. 2 is a part sectional plan of Fig. 1.

In carrying the invention into effect according to the present construction, a work carrying table $a$ is provided, constrained to rotate about its axis by a bearing, $b$, in the bed member, $c$. Concentric to the table, $a$, and surrounding the same, is a ring member, $d$, having upon its outer periphery worm wheel teeth, $e$, and upon its upper periphery, spur wheel teeth, $f$. The indexing member, $d$, or parent gear is constrained to rotate concentric with the table, $a$, by a circular depending portion $g$ extending into a groove in the bed member $c$. Upon the table, $a$, bearings, $h$ $j$, are provided, in which rotates the spindle, $k$, carrying at one end a spur wheel, $l$, engaging the teeth, $f$, and near its middle a spur wheel, $m$, adapted to engage a spur wheel, $n$, carried by a shaft $o$, in bearings, $p$ and $q$, upon the bed. The shaft, $o$, also carries a worm wheel, $r$, which engages a worm, $s$, mounted upon the central spindle, $t$, which is fixed to the bed, $c$, by the stud, $u$. The worm wheel teeth, $e$, are engaged by the worm, $v$, which is driven by suitable gearing in the well known manner.

The action of the apparatus is as follows:—Upon the worm, $v$, being rotated, the indexing member or parent gear, $d$, rotates about its axis, and in so doing tends to rotate the pinion, $l$, shaft, $k$, and pinion, $m$. The pinion, $m$, engaging the pinion, $n$, tends to cause rotation of the shaft, $o$, and consequently the worm wheel, $r$. As the pinion, $l$, cannot rotate freely owing to the engagement between $r$ and $s$, the table is carried around in the same direction as $d$, but in so doing, the worm wheel, $r$, is moved around the stationary worm, $s$, and consequently rotation of the worm wheel, $r$, takes place, which rotation is transmitted to the pinion, $l$. It will be understood that the rotary motion, due to the movement of $r$ bodily around $s$ is superposed upon the rotary motion caused by engagement of the teeth, $f$, with the pinion, $l$, and causes a relative movement between the table, $a$, and the ring $d$. With the worm, $s$, right handed, as shown in the drawing, the superposed rotary motion will cause an advance of the table in the direction of rotation of the member, $d$.

Having now described our invention, what we claim as new and desire to secure by Letters Patent is:—

1. A gear cutting machine, comprising a table on which the work is mounted, a parent gear, having a driving and a driven member means between said driven member and said table whereby said table is rotated by said driven member but at a different rate therefrom.

2. A gear cutting machine comprising a table on which the work is mounted, a parent gear, having a driving and a driven member said driven member being concentric with said table means between said driven member and said table whereby said table is rotated by said driven member but at a different rate therefrom.

3. A gear cutting machine comprising a parent gear having a driving and a driven member a table on which the work is mounted a train of gearing attached to said table and gearing with said driven member of the parent gear whereby said table is rotated by said driven member but at a different rate therefrom.

4. A gear cutting machine comprising a work carrying table a ring member concentric therewith worm teeth upon said member bevel teeth upon said member a worm engaging said worm teeth whereby said ring member is rotated two parallel shafts mounted in said table a bevel pinion on one of said shafts whereby its shaft is rotated by the ring member a spur wheel on the same shaft a spur wheel on the other shaft engaged by the first mentioned spur wheel whereby the latter shaft is rotated a worm wheel on the latter shaft, and a worm engaging said worm wheel and secured to a stationary shaft positioned coaxially with the table.

5. In combination in a gear cutting machine, a work-table, a ring member, means to rotate said ring, and means between said table and said ring acting to rotate said table from said ring and at a different rate therefrom.

6. In combination in a gear cutting machine, a ring member, a work table adapted to rotate about an axis lying within the circumference of said ring, means to rotate said ring, and means between said table and said ring acting to rotate said table from said ring and at a different rate therefrom.

In testimony whereof, we affix our signatures in presence of two witnesses.

CHARLES A. PARSONS.
ALFRED QUINTIN CARNEGIE.
STANLEY SMITH COOK.

Witnesses:
FREDERICK GORDON HAY BIDFORD,
ALBERT WILLIAM PARR.